July 9, 1929.   E. H. SMITH   1,720,451
BREAD TOASTER

Original Filed Jan. 12, 1927   3 Sheets-Sheet 1

Inventor
ELMER H. SMITH
By Pauel, Paul Moore
ATTORNEYS

Inventor
ELMER H. SMITH

Attorneys

July 9, 1929.  E. H. SMITH  1,720,451
BREAD TOASTER
Original Filed Jan. 12, 1927  3 Sheets-Sheet 3
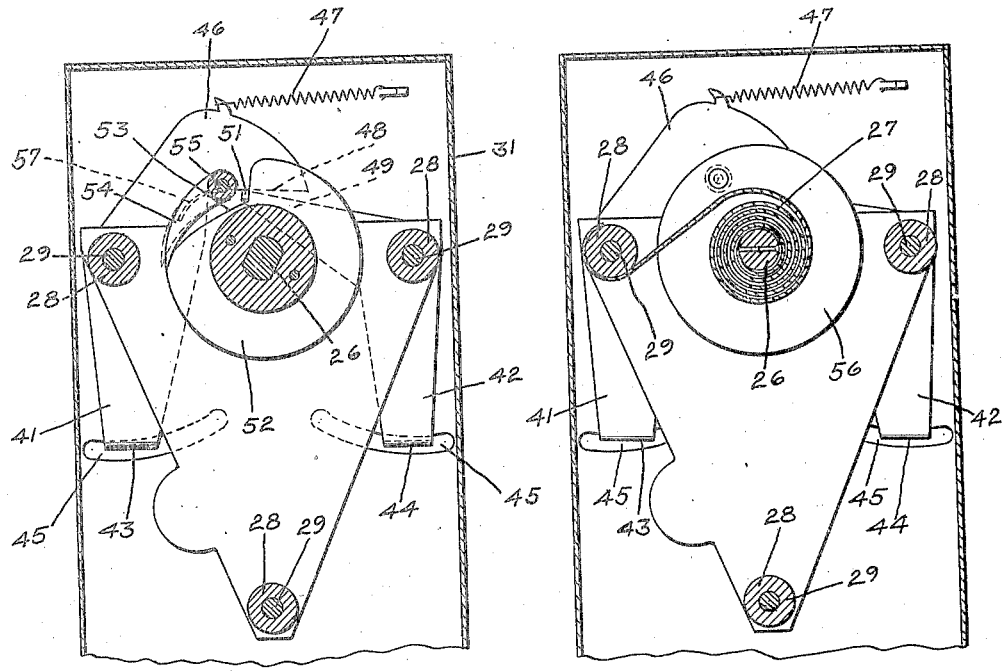
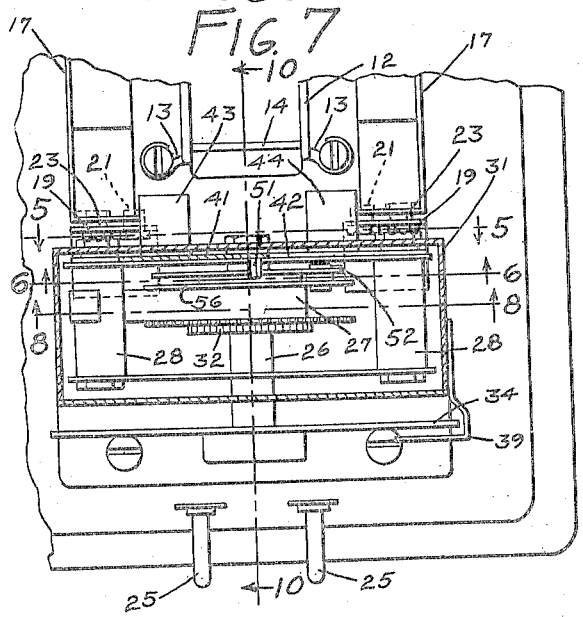
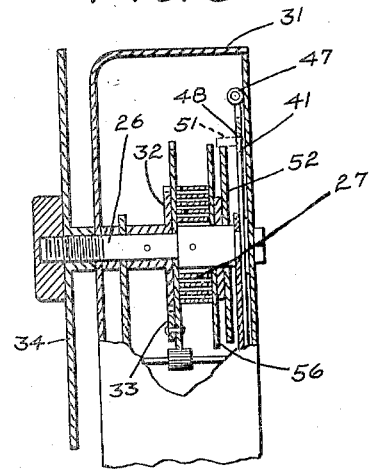
Inventor
ELMER H. SMITH
ATTORNEYS Patented July 9, 1929.

1,720,451

UNITED STATES PATENT OFFICE.

ELMER H. SMITH, OF MINNEAPOLIS, MINNESOTA, ASSIGNOR TO DIAL TOASTER CORPORATION, OF MINNEAPOLIS, MINNESOTA, A CORPORATION OF MINNESOTA.

BREAD TOASTER.

Application filed January 12, 1927. Serial No. 160,671.

REISSUED

This invention relates to new and useful improvements in bread toasters, generally, and more particularly relates to an improvement over the form shown in Patent No. 1,532,951, granted to Dayton A. Rogers.

An object of this invention is to provide a bread toaster comprising a base having a bread holder centrally mounted thereon and also having pivotally mounted heating elements adapted to be moved into bread-toasting positions adjacent to the sides of said bread holder, and, further having means for automatically moving the heating elements to their non-toasting positions, after a predetermined interval.

A further object is to provide a bread toaster having a pair of oppositely movable heating elements pivotally mounted upon the base thereof with means for moving them into upright bread-toasting positions adjacent to a bread holder; means also being provided for moving the elements away from the bread holder to their non-toasting positions.

Other objects of the invention reside in the constructional details of the apparatus; the manner of mounting the heating elements upon the base; the provision of a bread toaster having its top, bottom and ends open while toasting; and, the simplicity of the apparatus as a whole.

Other objects of the invention will appear from the following description and accompanying drawings and will be pointed out in the annexed claims.

In the drawings there has been disclosed a structure designed to carry out the various objects of the invention, but it is to be understood that the invention is not confined to the exact features shown, as various changes may be made within the scope of the claims which follow.

In the accompanying drawings forming part of this specification,

Figure 7 is a view similar to Figure 6 with the parts in different positions;

Figure 8 is a vertical sectional view on the line 8—8 of Figure 9;

Figure 9 is a sectional plan view on the line 9—9 of Figure 1; and

Figure 10 is a vertical sectional view on the line 10—10 of Figure 9.

Figure 1:
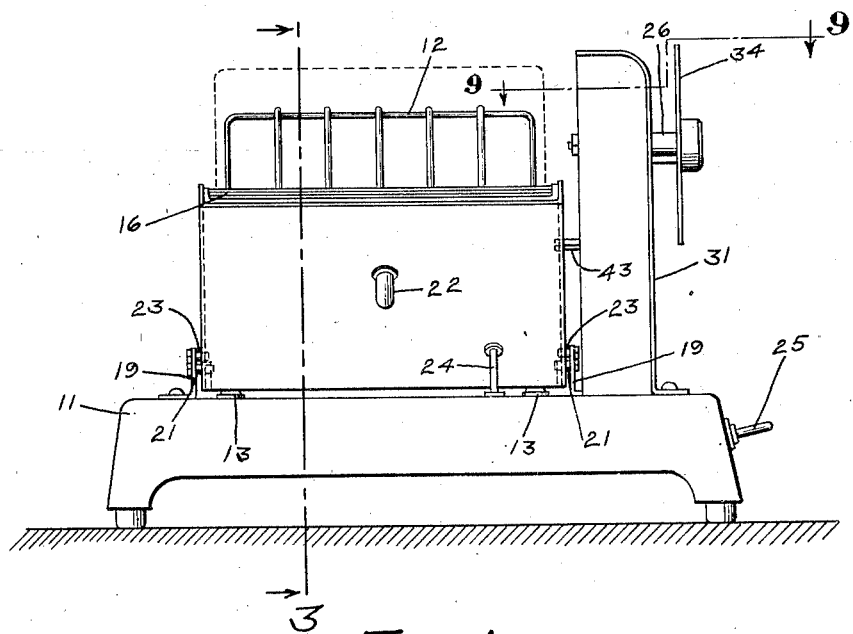
Figure 1 is a side elevation of the improved bread toaster showing the hinged heating elements in non-toasting positions.
Figure 2:
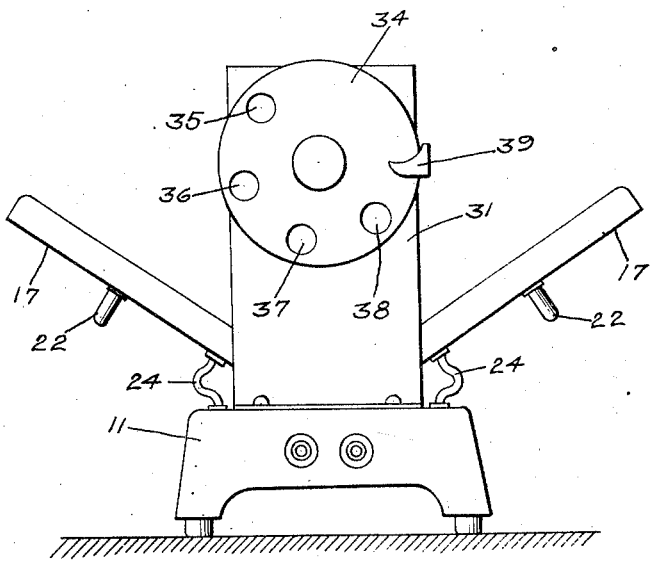
Figure 2 is an end view of Figure 1.
Figures 3, 4:
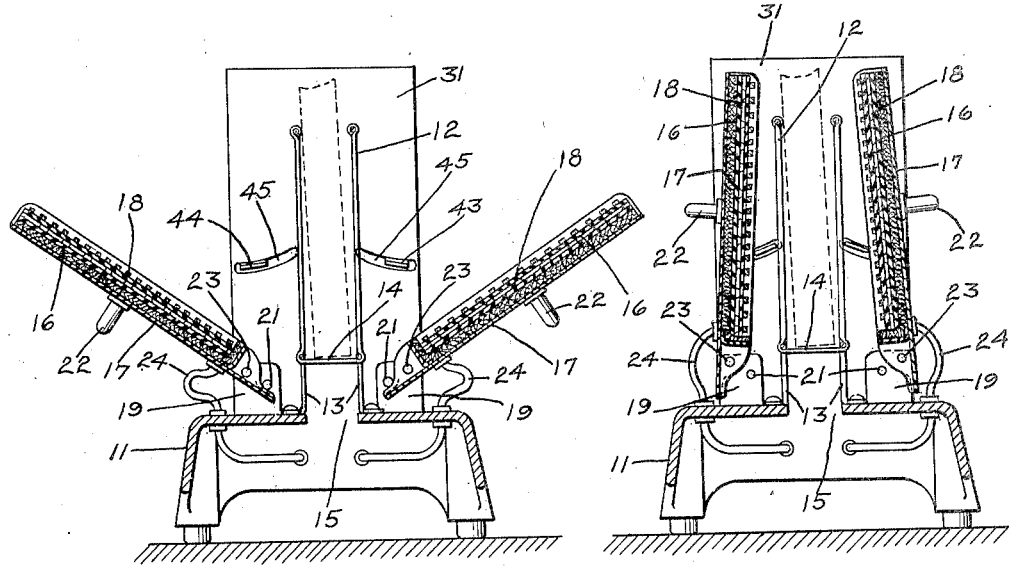
Figure 3 is a vertical sectional view on the line 3—3 of Figure 1.
Figure 4 is a similar view showing the heating elements in their bread-toasting positions.
Figure 5:
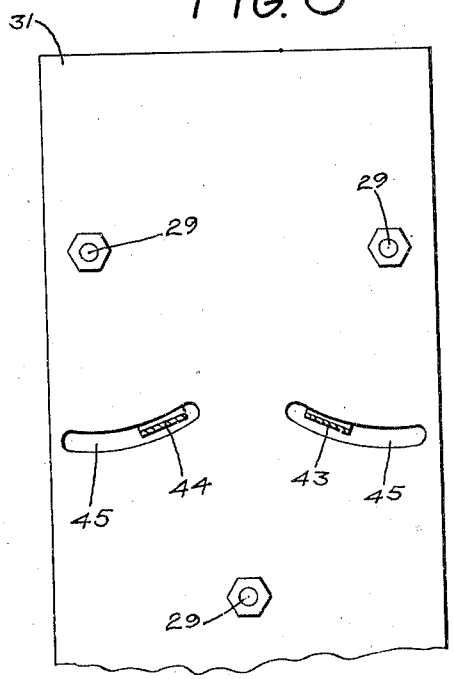
Figure 5 is a vertical sectional view on the line 5—5 of Figure 9.

In the selected embodiment of the invention here shown, there is illustrated a bread toaster comprising a base 11 having a bread holder 12 mounted thereon, as shown in Figures 3 and 4. This holder is preferably constructed of wire members as shown in Figure 1, and is supported upon suitable legs or feet 13 secured to the top of the base. The bottom 14 of the bread holder 12 is spaced from the top wall of the base 11, which has an elongated opening 15 therein. The top and both ends of the bread holder are open so that the bread may be inserted at the top or one end.

A feature of the invention resides in the mounting of the heating elements 16 upon the base 11. Each heating element comprises a frame 17, preferably of sheet metal, and having an electric resistance coil 18 mounted thereon and suitably insulated therefrom. Each frame 17 is pivoted upon brackets 19 secured to the base 11. Stop pins 21 are secured in the brackets 19 to limit the outward movement of the heating elements 19, as shown in Figure 3. Each heating element is further provided with a hand grip 22 whereby it may be manually raised to its operative bread-toasting position, as shown in Figure 4. The pivots 23 of the heating elements are preferably so arranged that the heating elements will be held in their operative positions by gravity. Flexible connections 24 connect the heating elements with suitable terminals 25 adapted to be received in the usual socket of an electric cord, not shown.

The mounting of the heating elements in the above described manner provides a very simple and inexpensive structure. When the heating elements are in their inoperative positions, as shown in Figure 3, the bread holder is exposed on substantially all sides, as there are no end walls or top member. When the heating elements are in their bread-toasting positions, as shown in Figure 4, the bread supported in the holder 12 may be viewed from one end or from the top of the toaster.

Means are provided for moving the heating elements from their bread-toasting to their inoperative positions, shown in Figure 3. Such means consists of a suitable clock mechanism comprising a main shaft 26 having a spring 27 coiled thereabout with one end secured thereto and its other end engaging a spacing collar 28, mounted upon a pin 29. This collar and pin cooperate with similar collars and pins 28 and 29, to secure together the walls of the clock casing 31. A ratchet wheel 32 is secured to the shaft 26 and is engaged by a pawl 33 which functions to retain the shaft 26 in its operative position, when the spring 27 is under tension. A disk 34 is terminally secured to the shaft 26, exteriorly of the casing 31, and has a series of finger-receiving holes 35, 36, 37 and 38 by means of which the disk, and therefore the shaft 26, may be rotated clockwise. A finger stop 39 is arranged to be engaged by the operator's finger, to limit the rotation of the disk 34. Pivotally attached to the clock casing 31 are depending levers 41 and 42 having lugs 43 and 44, respectively, projecting through arcuately formed slots 45 provided in the wall of the casing 31, as shown in Figures 5, 6, 7 and 8. The lugs 43 and 44 project through the slots 45 and extend into the path of heating elements 16, as shown in Figure 1, so that when the heating elements are in their operative positions as shown in Figure 4, and the lugs 43 and 44 are outwardly moved as a result of their connection with the clock mechanism, the lugs will engage the inner portions of the heating elements and swing them outwardly until they drop by gravity into the positions shown in Figure 3. When the heating elements are thus positioned, the bread may be kept hot without danger of burning it.

The depending arm 41 is provided with an off set portion 46 having a tension spring 47 connected therewith which tends to swing the arm 41 on its pivot in an outward direction. The extension 46 has a straight edge 48 engaging an extension 49 provided upon the arm 42. This extension 49 of the arm 42 has an offset lug 51 riding upon a cam disk 52 as shown in Figure 7. This lug 51 is held in constant contact with the periphery of the cam disk 52 by the action of the spring 47. The disk 52 is provided with a cutaway portion 53 within which is mounted a spring actuated gate 54, carried by a pin 55 supported by a disk 56 spaced from the cam-like disk 52.

Figure 6:
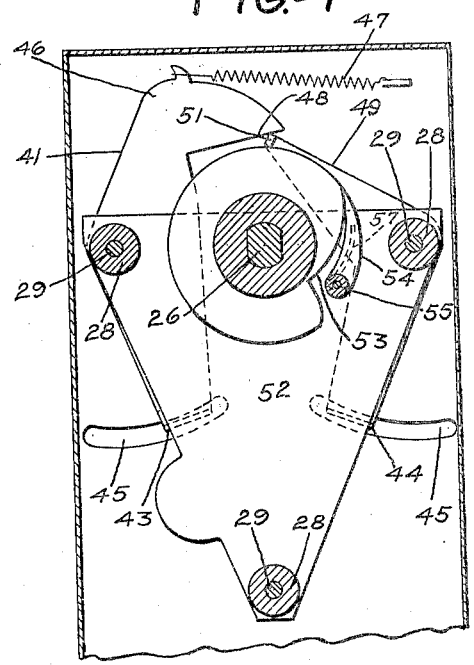
Figure 6 is a vertical sectional view on the line 6—6 of Figure 9.

At the beginning of the winding operation the lug 51 is positioned at the cutaway portion of the cam disk 52, as shown in Figure 7. During the winding operation, the cam disk is moved from the position shown in Figure 7 to a position such as shown in Figure 6, the exact amount of movement of the disk being determined by the extent to which the disk 34 is rotated. As the lug 51 slides up the cam portion of the disk 52, it forces the gate 54 open against the tension of a small spring 57 to permit the passage of the lug, after which the gate again closes. As the lug 51 is thus moved outwardly, the levers 41 and 42 are moved into the position shown in Figure 6. This causes the lugs 43 and 44 to move inwardly to the positions shown in Figure 5 so that the heating elements may be moved to their operative positions, as shown in Figure 4, without interference from the projecting lugs 43 and 44. After the clock mechanism has thus been reset and the arms 41 and 42 move inwardly to the positions shown in Figures 4, 5 and 6, they will remain in such positions until the clock mechanism has rotated the disks 51 and 56, and therefore the gate 54, to the position shown in Figure 7, wherein it will be noted that the lug 51 has passed over the outer edge of the gate 57 and has dropped into the cutaway portion of the cam disk 52 by the action of the spring 47. Such movement of the lug 51 will cause the arms 41 and 42 to be moved outwardly with the result that the projecting lugs 43 and 44 will engage the heating elements and automatically move them outward to their inoperative positions as shown in Figure 3.

This clock mechanism is shown and described in detail in the above mentioned patent, and I do not claim the constructional details thereof as a part of this invention. Obviously, other mechanisms might be used for actuating the heating elements 16 in a manner similar to that above described. In the drawings I have shown the heating means as electrically heated, but it is to be understood that by slightly modifying the frames 17, they may be adapted for gas burners, the use of which may be desirable in the construction of large toasters such as are used in restaurants and cafes.

This novel toaster, as shown, is adapted to toast both sides of each bread slice at the same time. However, by making the bread holder wider, two slices may be inserted at one time, in which case each slice will have one side toasted at a time. The elongated opening 15 in the base permits air to circulate therethrough.

I claim as my invention:

1. A bread toaster comprising a base, heating elements pivotally mounted on said base and adapted to be moved to upright operative positions, an immovable bread holder mounted between said heating elements, and means for moving the heating elements outwardly away from the bread holder to inoperative positions.

2. A bread toaster comprising a base, heating elements pivotally mounted on said base and having means for moving them to upright operative positions, and an immovable bread holder mounted between said heating elements, said bread holder being open at the bottom, top, and ends.

3. A bread toaster comprising a base having an elongated opening therein, a bread holder immovably mounted on the base over said opening and with its bottom spaced from the top wall of the base, said bread holder being open at the top and at one end to permit a slice of bread to be inserted therein, a heating element pivotally mounted upon the base at each side of said bread holder and having means for connection with a source of electrical energy, means for moving said heating elements to upright bread-toasting positions adjacent to said bread holder, and a timing mechanism adapted to automatically move said heating elements to non-toasting positions, after a predetermined length of time.

4. A bread toaster comprising a base, a bread holder secured thereon and having its bottom spaced therefrom, said holder being open at its top and ends, a heating element at each side of the holder, and means on the base adapted to pivotally support said heating elements.

5. A bread toaster comprising a base, a bread holder secured thereon, a movable heating element at each side of the holder, members for supporting the heating elements, lugs secured to the base for pivotally supporting said members, means on said lugs for limiting outward movement of the element-supporting members, and the pivotal connections of said members with said lugs being such as to cause the members to be held in bread-toasting position by gravity.

In witness whereof, I have hereunto set my hand this 31st day of December 1926.

ELMER H. SMITH.